INVENTOR.
JOHN E. SCOTT
BY
S. C. Yeaton
ATTORNEY

INVENTOR.
JOHN E. SCOTT
BY
[signature]
ATTORNEY

United States Patent Office 3,453,615

Patented July 1, 1969

3,453,615

ANALOG-TO-DIGITAL CONVERTERS

John E. Scott, Rego Park, N.Y., assignor to Sperry Rand Corporation, Great Neck, N.Y., a corporation of Delaware Filed Apr. 5, 1965, Ser. No. 445,372
Int. Cl. H03k 13/02
U.S. Cl. 340—347 9 Claims

ABSTRACT OF THE DISCLOSURE

A binary encoder includes a voltage divider comprising a series resistor and a group of binary weighted shunt resistors. A logic means switches individual shunt resistors into the circuit successively. One end of each shunt resistor is connected to a source of reference voltage. The logic holds the other end of each shunt resistor at a standby voltage during the time that the resistor is not connected in the divider circuit. A level detector connected to the junction of the series and shunt resistors produces an error signal whenever a shunt resistor that is switched into the circuit produces an abnormal junction voltage. This error signal actuates the logic circuit so as to return that resistor to the standby condition.

This invention relates to analog-to-digital converters and more specifically to successive approximation voltage-to-digital encoders.

A large variety of analog-to-digital encoders are presently available. One category of these encoders employs a successive approximation technique. In this technique, individual calibrated resistors, each representing a specific binary digit, are inserted in a comparison circuit in a definite sequence. After each comparson, a decision is made as to whether or not the corresponding binary digit should be included in the final result.

These prior art encoders are described in the article entitled "Voltage-To-Digital Converters and Digital Voltmeters," by Paul Barr, appearing on pages 147–159 of the System Designer's Handbook for January 1964, published by Electromechanical Design Magazine.

Although these prior art circuits have great utility, they are limited in speed by the settling time of the comparator.

Furthermore, these circuits must provide switching means capable of transferring the various calibrated resistors from ground potential to a relatively high referance potential. This requires the use of elaborate electronic switches. Switching between ground and the relatively high reference voltage also results in appreciable current transients. These transients can cause radio frequency interference in the associated circuits.

The prior art circuits also require a comparatively large, highly regulated voltage supply for a source of reference voltage. This is necessitated by the fact that the loading of the voltage supply varies from practically zero when none of the calibrated resistors are inserted, to a maximum when all of these resistors are inserted.

It is an object of the present invention to provide a successive approximation encoder having exceptionally high speed capabilities.

It is also an object of the present invention to provide a successive approximation encoder that eliminates the need for critical electronic switching circuits.

It is another object of the present invention to provide a successive approximation encoder that minimizes the effects of radio frequency interference.

It is still another objcet of the present invention to provide a successive approximation encoder that eliminates the need for highly regulated power supplies.

These and other objects are achieved by purposely limiting the voltages to be switched to a value near a bias level and by bleeding current from the source of reference voltage through the calibrated resistors at all times.

The principles and operation of the invention may be understood by referring to the following description and the accompanying drawings.

Figure 1:
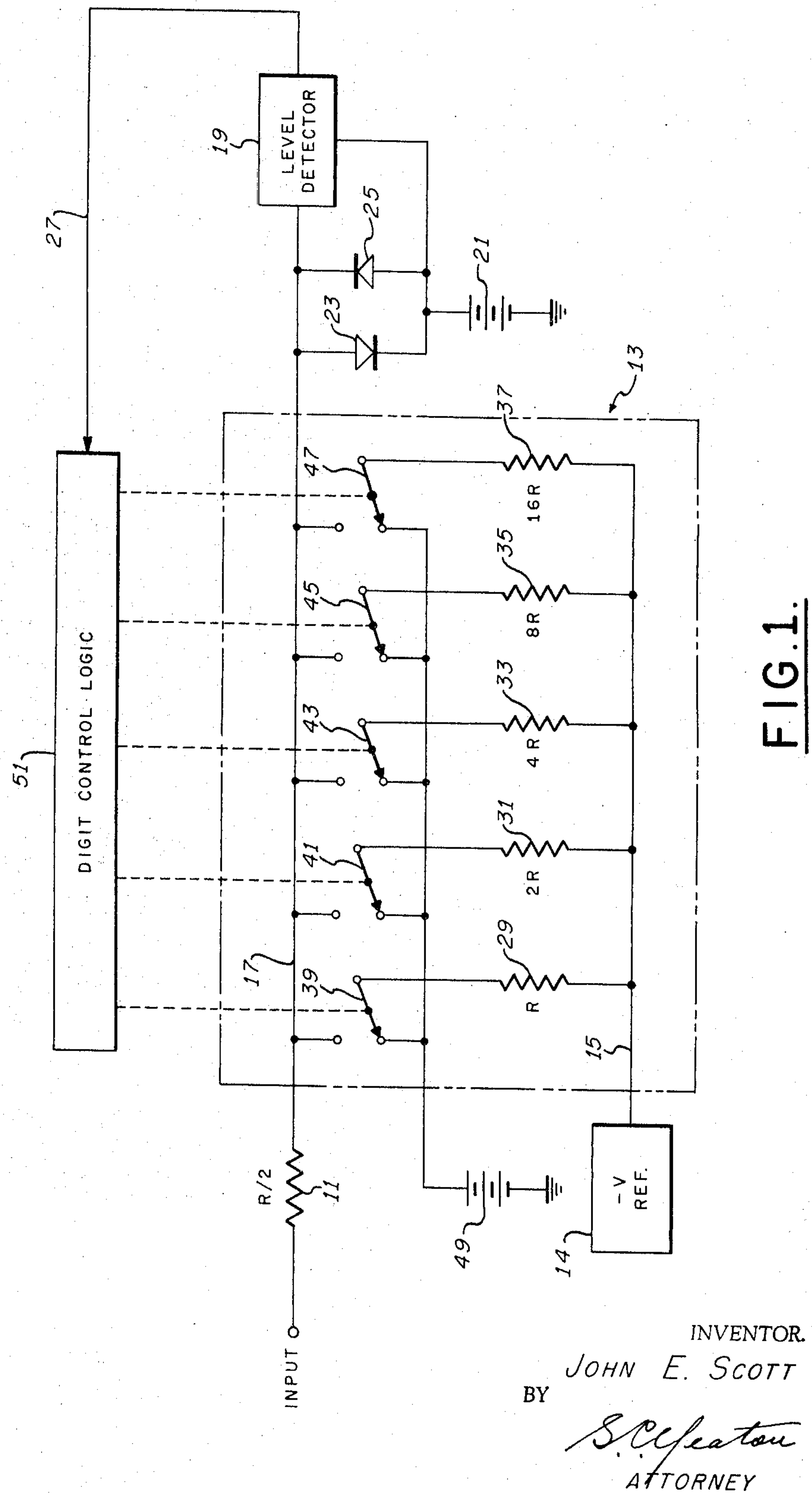
Figure 2:
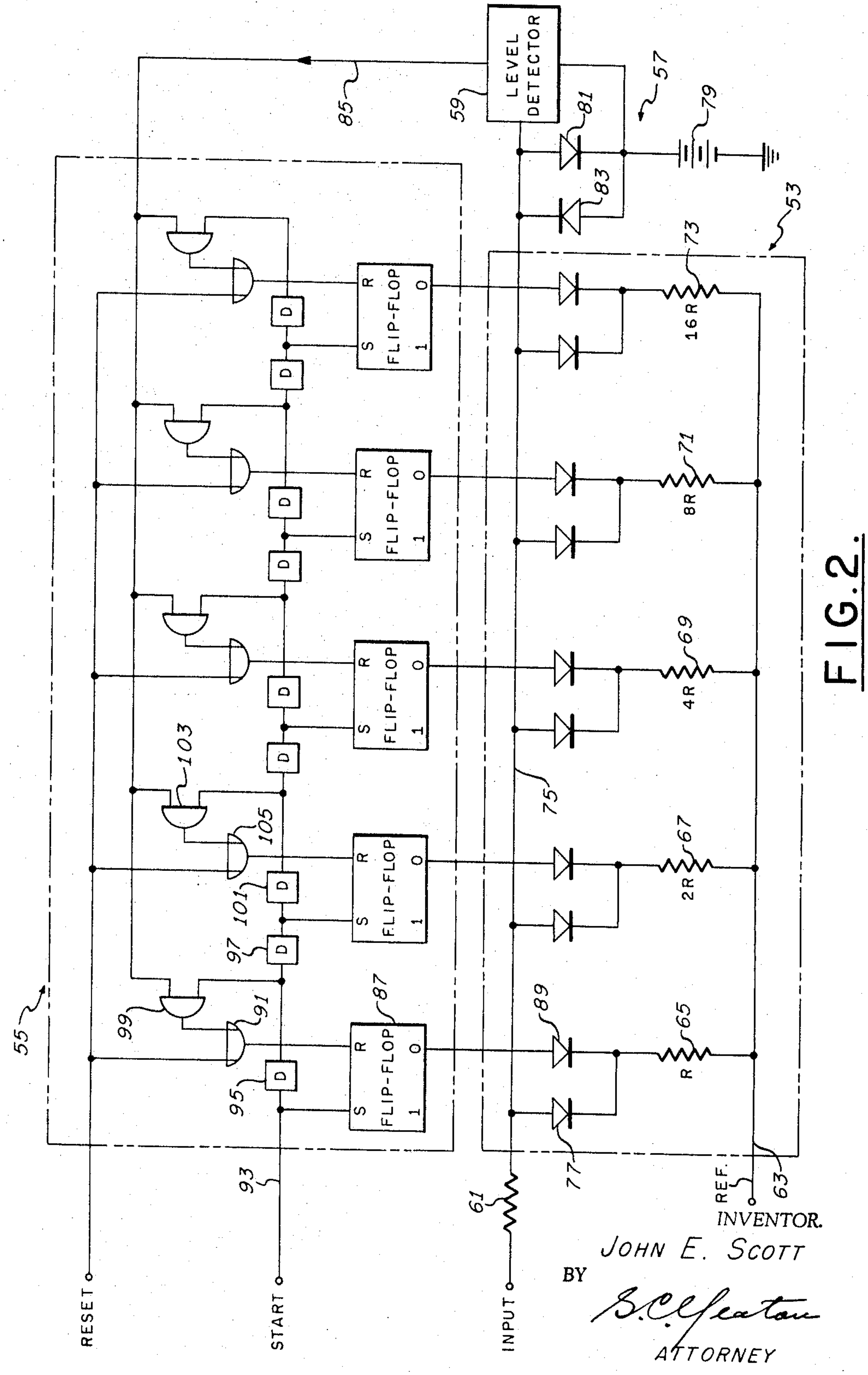

FIG. 1 is a simplified schematic drawing helpful in understanding the principles of the invention; and FIG. 2 is a block diagram of a circuit employing the principles of the invention.

Referring now to FIG. 1, an unknown positive input voltage is applied through a series resistor 11 to a current balancing network 13. A reference voltage from a reference source 14 is also applied to the current balancing network through the reference line 15. This reference voltage has a polarity opposite to that of the unknown voltage.

Signals from the series resistor 11 are applied to the summing node line 17. The summing node line is extended through the current balancing network to a level detector 19. The quiescent voltage of the line 17 is determined by a source of bias voltage 21. This bias voltage provides a convenient datum to which other voltages may be referred. A pair of oppositely polarized clamp diodes 23 and 25 are connected across the input to the level detector. Since these diodes are connected in an inverse shunt relationship, they limit the input signal swing on the summing node line to approximately $\pm 1$ volt.

The level detector 19 serves to provide an output pulse to an error line 27 if and only if the voltage on the summing node line 17 is of a given polarity with respect to the bias voltage from the source 21. If the voltage on the summing node line happens to be of the opposite polarity, the level detector provides no output signal.

The design of the level detector is straightforward. Essentially this detector contains an amplifying means and a rectifying means to block signals of the undesired polarity.

The current balancing network contains a group of binary weighted resistors 29, 31, 33, 35 and 37, each connected to the reference line 15. These resistors have relative values such that each succeeding resistor has a resistance double that of the preceding resistor. The design of such a group of binary weighted resistors is well-known in the art and is used in the successive approximation techniques described in the System Designer's Handbook article cited earlier.

Each binary weighted resistor is connected to one of the double throw switches 39, 41, 43, 45, and 47. Each of these switches serves to connect a binary weighted resistor to a source of standby voltage 49 under normal conditions, or to the summing node line 17 when the switch is actuated.

The switches are actuated sequentially by signals from the digit control logic circuit 51 beginning with the switch 39. In addition, the digit control logic circuit receives error signals from the line 27 and operates to retain a given switch in the actuated or "test" condition if the level detector senses a positive voltage on the sensing node. If the level detector senses a negative voltage when a given switch is actuated, the digit control logic circuit returns the switch to the standby position before the following switch is actuated.

The construction of a suitable digit control logic circuit will be described with reference to FIG. 2.

The bias voltage source 21 and the standby voltage source 49 have been shown a sseparate elements in FIG. 1 in order to illustrate the principles of the invention in a general form. Basically, these sources serve to maintain a desired relationship between the voltage levels of the various elements in the encoder.

The magnitudes of the voltages chosen will depend upon the magnitudes of the input and reference voltages as well as the type of switching elements chosen. The some instances, it may be convenient to return the clamping diodes or the standby bus to ground.

The clamping diodes 23 and 25 maintain the voltage on the summing node line 17 within a narrow range. In general, the standby voltage level should be within or close to this range so that the switches move between points of nearly equal potential.

In operation, an unknown positive D.C. voltage is applied to the input terminal. The switches of the circuit of FIG. 1 are closed in succession from left to right. This applies resistances of successively higher value to the summing node line. A binary weighted resistor when in the test position, together with the series resistor 11, form a voltage divider whose junction is the summing node line.

After each switch is actuated, the level detector senses if the resulting node voltage is above or below the bias voltage. If the node voltage is above the bias voltage, the level detector actuates the digit control logic so that the switch is retained in the actuated condition. If the voltage on the summing node line is below the level of the bias voltage, however, the level detector causes the digit control logic to return its resistor to the standby position. The digit control logic then causes the following switches to be actuated in sequence. After each switch is closed, the circuit makes a decision as to whether or not the switch should remain in the actuated condition or return to the standby condition.

The position of the various switches after the sequence is completed indicates the binary number equivalent to the input voltage.

It will be noticed that in the normal condition, the switches are all connected between the voltage reference line 15 and the standby voltage source. They thus serve as bleeder resistors to draw a substantially constant current from the reference source. The clamping diodes 23 and 25 maintain the maximum voltage on the summing node line 19 within approximately one volt of the bias line voltage regardless of the magnitude of the input signal. Thus when any or all of the switches are actuated, the load on the voltage reference source remains substantially constant.

Furthermore, since the clamping diodes limit the voltage diodes between the summing node and the bias line to a relatively small value, switching transients are kept to a low level under all switching conditions.

A practical embodiment of the invention is illustrated in FIG. 2. In this circuit, the need for a standby bus is eliminated by returning each binary weighted resistor to the output of a flip flop circuit during normal conditions.

The circuit includes a current balancing network 53, a digit control logic circuit 55, a summing node limiting means 57, and a level detector 59.

The current balancing network receives unknown positive D.C. voltages from an input terminal through a series resistor 61 and a negative reference voltage through a voltage reference line 63. Binary weighted resistors 65, 67, 69, 71, and 73 are each connected to the voltage reference line.

Each binary weighted resistor is connected to the summing node line 75 through a node diode such as the diode 77 in the input stage. The diodes are oriented so as to pass current from the summing node line to the reference voltage line.

The voltage on the summing node line is held within a desired range by the summing node limiting means 57. The quiescent voltage on this line is maintained at a positive bias by a suitable bias source, conveniently designated as a battery 79 in the figure. The summing node limiting means 57 also contains a pair of clamp diodes 81 and 83. In the circuit illustrated, the voltage source 79 typically provides about 1.5 volts. The clamping diodes therefore limit the voltage swing on the summing node between voltages of about 0.5 to 2.5 volts with respect to ground.

The voltage on the summing node line is applied to the level detector 59 which compares this voltage to the voltage at the positive terminal of the bias source 79. The level detector provides an output error signal on the line 85 whenever the voltage level of the summing node line goes negative with respect to the bias voltage.

The digit control logic circuit 55 includes a flip flop circuit for each of the binary weighted resistors. These flip flop circuits are typified by the circuit 87 in the input stage of the encoder. The binary weighted resistors are coupled to receive the complementary output signals from the corresponding flip flop circuits. The flip flop circuits in the embodiment illustrated are designed to produce output voltages alternating between levels of approximately +3 volts and zero volts. Thus a voltage of substantially +3 volts is applied to a resistor network when the corresponding flip flop is in the binary ZERO state and substantially zero voltage is applied to the network when the flip flop is in the binary ONE state. The flip flops further contain a pair of input terminals so that they may be switched to the binary ONE state by a START pulse and to the binary ZERO state by a RESET pulse. An input diode such as the diode 89 in the first stage of the encoder is connected between the output of each flip flop and the corresponding binary weighted resistor so as to pass a current from the positive terminal of the flip flop to the resistor when the flip flop has been switched to the binary ZERO state by a RESET pulse. This provides a back bias on the node diode 77, regardless of the magnitude of the applied input signal, and effectively connects the binary weighted resistor to a +3 volts source.

The diodes 77 and 89 thus constitute a double throw switch: When the flip flop is in the binary ZERO state, the binary weighted resistor is connected to a +3 volt source; when the flip-flop is in the binary ONE state, the binary weighted resistor is connected to the summing node line.

A RESET pulse can be applied to each stage through an OR gate such as the OR gate 91 to set each of the flip flops to the binary ZERO state.

START pulses are applied to a start line 93 and pass directly to the start input terminal of the flip flop 87. The start line contains a stage delay such as a delay 95 for each stage of the encoder. This line further contains an interstage delay such as the delay 97 between adjacent stages.

Each stage further contains an AND gate such as the gate 99 associated with the input stage. These AND gates are connected to pass a signal to the reset terminal of he associated flip flop when a pulse from the particular stage delay is accompanied by a signal on the line 85.

The circuit is prepared for operation by applying a RESET pulse. This switches each flip flop to the binary ZERO state and applies a potential of +3 volts to each of the input diodes such as the diode 89. This connects the reference line to a +3 volt source through each binary weighted resistor.

With an unknown D.C. voltage applied to the input terminal, a START pulse is applied to the line 93. This pulse passes immediately to the flip flop 87 and switches this flip flop so as to remove the back bias on the node diode 77. The resistor 65 is now connected in series with the resistor 61 and the voltage at the junction of these two resistors is applied to the level detector. If this voltage remains positive with respect to the bias voltage at the positive terminal of the source 79, no output will be produced by the level detector 59.

After a predetermined time the START pulse will pass through the delay 95 and appear at one input terminal of the AND gate 99. Since there is no voltage being applied to the second input terminal of this AND gate, however, no pulse can pass through this gate. The flip flop 87 will remain in the binary ONE state and the resistor 65 will remain connected to the summing node line.

The START signal will eventually pass through the interstage delay 97 so as to switch the second flip flop to the binary ONE state. This connects the resistor 67 to the summing node line. Assuming that this resistor draws sufficient current to drop the voltage on the summing node line below the level of the bias source, the level detector will produce an error signal on the line 85. When the input signal passes through the following stage delay 101, it will be applied to the AND gate 103 of the second stage. Since a signal is also being supplied to the line 85, this AND gate will produce an output which can pass through the OR gate 105 to reset the flip flop and disconnect the resistor 67 from the summing node line. This will return the voltage on the summing node line to a positive value so that the subsequent binary weighted resistors can be connected sequentially to the summing node line.

Each binary weighted resistor will be connected in turn as the START pulse passes through each delay means. When the cycle is completed, the resistors still connected to the summing node line will represent the binary value of the unkown voltage. This state of the resistors may be determined by connecting conventional indicating means to the output terminals of the flip flops.

The clamp diodes serve to pass an offset current when a large input voltage is encountered. This offset current reduces the voltage on the summing node line to a level within the range of the summing node limiting means 57. As various binary weighted resistors are connected to the summing node line, the sum of the currents drawn through these resistors and the offset current through the clamp diodes remain constant until the resistors draw sufficient current to bring the voltage on the summing line within the desired range. At this level, the clamp diodes cease conducting.

Since the voltage swing at the summing node is relatively small, the stray capacitances in the circuit are quickly charged to a value within an acceptable fraction of their final value after each switch is operated. Because this charging time is consideralby less than that necessary in the prior art circuits, high speed operation is possible.

Since the load on the reference supply is essentially constant during the encoding process, the reference voltage can be made large relative to the voltage change at the switch end of the binary weighted resistors. The change in current drawn from the input source during the encoding process is also relatively small. Because of these factors, the reference supply input circuits are not required to have as low an output impedance as is the case with prior art devices. These circuit elements may therefore be made smaller and less costly than those used with the prior art devices.

Furthermore, since the current changes in the balancing network resistors are relatively small, the self-inductance values of these resistors for any given speed may be correspondingly higher. Because of this, less expensive resistors or resistors of a smaller size may be used.

Because the switching in the current balancing network takes place at the summing node line, the diode switching means illustrated in FIG. 2 may be employed. This diode switching means also contributes to a higher speed encoder. Prior art devices required the use of transistor type switches which in turn required a finite time for the transistor to saturate or cut off during the switching operation.

It will be appreciated that voltages of a specific polarity have been described merely as a means of illustration. Input voltages of a negative polarity may be measured by making obvious modifications to the described circuits.

In some applications, it may be preferable to reverse the action of the error detecting logic so that an error signal is produced when the voltage on the summing node, relative to the bias source, is of the same polarity as the input signal. In this variant of the invention, the presence of an error signal prevents resetting of the flip flop.

Although a particular delay network has been described for sequentially scanning the flip flop circuits, this function may be performed by an external scanning pulse generator if so desired.

The embodiments of the invention have been described as having five stages. It will be appreciated that some applications may require fewer stages and still other applications may require more stages than the illustrated embodiments. In general, each succeeding stage employs a resistor having double the resistance of the resistor in the previous stage.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A binary encoder comprising a bias means to provide a datum voltage to which the polarity of various circuit voltages may be referred; a voltage divider; means to apply an unknown input voltage across said voltage divider; series and shunt arms in said voltage divider, said arms being connected together at a junction point; switching means for sequentially connecting successively higher-valued resistors in parallel in said shunt arm; a pair of diodes connected in inverse shunt relationship between said junction point and said bias means to limit the voltage swing of said junction point; means connected across said diodes to provide an error signal in response to a junction point voltage of specified polarity; logic means connected to said switching means, said logic means being responsive to an error signal to disconnect any parallel resistor that causes the polarity of the junction point voltage to become opposite that of the unknown voltage; and means connected to said switching means for indicating which of the parallel resistors remain connected at the termination of a measurement cycle.

2. A binary encoder comprising a bias means to provide a datum voltage to which the polarity of various circuit voltages may be referred; a voltage divider; means to apply input signals of known polarity across said voltage divider; a junction point on said voltage divider; limiting means connected between said junction point and said bias means to restrict the voltage swing of said junction point to a specified range above and below said datum voltage; detection means connected across said limiting means to produce error signals indicative of the polarity of the junction point voltage; logic means coupled to said voltage divider for establishing the ratio of said voltage divider; delay means in said logic means for periodically changing the ratio of said voltage divider; means in said logic means connected to receive an error signal and operative to reject any periodic change in divider ratio that produces a junction voltage having a polarity opposite to that of the input signal; and means in said logic means to indicate the changes in voltage divider ratio that has been completed in a given measurement.

3. A binary encoder comprising a group of binary weighted resistors; a source of reference voltage connected to a first end of each of said binary weighted resistors; a series resistor having a first end connected to receive input voltages to be converted; a junction point at a second end of said series resistor; switching means for sequentially connecting the second ends of successively higher valued binary weighted resistors to said junction point; means connected to said junction point for detecting the voltage level of said junction point with respect to said reference voltage; means in said detection means to provide an error signal if the difference in voltage between said junction point and said reference source becomes less than a predetermined value; limiting means connected to said junction point to restrict the voltage swing of the junction point to a small fraction of said reference voltage; said switching means including means to hold individual binary weighted resistors in a standby condition during intervals when the resistor is not connected to the junction point; and means connected between said detection means and said switching means to return a binary weighted resistor to the standby condition whenever connection of the resistor to the junction point causes an error signal.

4. A binary encoder comprising a group of binary weighted resistors; a source of reference voltage connected to a first end of each of said binary weighted resistors; a series resistor having a first end connected to receive input voltages to be converted; a junction point at the second end of said series resistor; bias means coupled to said junction point for establishing a quiescent voltage level for said junction point; switching means for sequentially connecting the second ends of successively higher valued binary weighted resistors to said junction point; detection means connected to said junction point for detecting the voltage level of said junction point with respect to said reference voltage; means in said detection means to provide an error signal if the difference in voltage between said junction point and said reference source becomes less than a predetermined value; voltage limiting means connected between said junction point and said bias means for restricting the range of voltage swings of said junction point to a narrow range extending above and below the quiescent voltage level of said junction point; said switching means including means to hold individual binary weighted resistors in a standby condition during intervals when the resistor is not connected to a junction point; and means coupled between said detection means and said switching means for returning a binary weighted resistor to the standby condition whenever connection of the resistor to the junction point causes an error signal.

5. A binary encoder comprising a group of binary weighted resistors; a source of reference voltage connected to a first end of each of said binary weighted resistors; a series resistor having a first end connected to receive input voltages to be converted; a junction point at the second end of said series resistor; bias means coupled to said junction point for establishing a quiescent voltage level for said junction point; switching means for sequentially connecting the second ends of successively higher valued binary weighted resistors to said junction point; level detection means connected to said junction point for detecting the voltage level of said junction point with respect to said reference voltage; means in said detection means to provide an error signal if the difference in voltage between said junction point and said reference source becomes less than a predetermined value; a diode clamping pair connected across the input to said level detection means; first and second diodes in said pair connected in inverse shunt relationship with each other; means in said switching means for holding individual binary weighted resistors in a standby condition during intervals when the resistor is not connected to a junction point; and means coupled between said level detection means and said switching means for returning a binary weighted resistor to the standby condition whenever connection of the resistor to the junction point causes an error signal.

6. A binary encoder comprising a group of binary weighted resistors; means to apply a reference voltage to one end of each of said resistors; a series resistor; a summing node line connected to receive input signals through said series resistor; means to provide standby voltages to individual binary weighted resistors; double throw switching means to connect individual resistors to a standby voltage under normal conditions and to said summing node lines under test conditions; a source of bias voltage; a pair of clamping diodes connected between said source of bias voltage and the summing node line, the diodes of said pair being connected in inverse shunt relationship with each other so that the pair can pass current in either direction; a level detector connected to receive the voltage across said pair, said level detector being constructed and arranged to provide an error signal when the voltage on the summing node line reaches a level intermediate the bias voltage and the reference voltage; means for sequentially actuating the individual switching means so as to connect successively higher valued binary weighted resistors to the summing node line; and means responsive to an error signal to return an individual switching means to the standby position.

7. The encoder of claim 6 wherein the standby voltage level is intermediate the bias voltage level and the maximum voltage level of the summing node line.

8. A binary encoder comprising a group of binary weighted resistors; means to apply a reference voltage to one end of each of said resistors; a series resistor; a summing node line connected to receive an input signal through said series resistor; level detecting means to provide an error signal whenever the voltage on said summing node line reaches a predetermined level; bias means to establish the quiescent voltage level of said summing node line; a pair of clamping diodes connected between said bias means and said summing node line, each of the diodes in said pair having its cathode connected to the anode of the other diode in said pair; a source of standby voltage; individual double throw switching means connected to the various binary weighted resistors, said switching means being arranged to connect a binary weighted resistor to the source of standby voltage during standby and to the summing node line during test; means for sequentially actuating the switching means so that the individual binary weighted resistors are switched to the test position in the order of increasing magnitude; and means to return a binary weighted resistor to the standby position if it causes an error signal to develop when switched to the test position.

9. A binary encoder comprising a group of binary weighted resistors; a series resistor; a summing node line connected to receive input signals through said series resistor; means to apply a reference voltage to a first end of each of said binary weighted resistors; individual node diodes connecting the second end of each binary weighted resistor to the summing node line; bias means to establish a quiescent voltage level for said summing node line; a pair of clamping diodes connected between said summing node line and said bias means, said pair of clamping diodes being arranged in reverse shunt relationship so that a current can pass through the pair in either direction; level detection means to provide an error signal whenever the voltage level on said summing node becomes intermediate the bias volage level and the reference voltage level; individual input diodes connected to the second end of each binary weighted resistor, said input diodes being connected to pass current in the same direction as the associated node diode; individual flip flops connected to each input diode, said flip flops being adjusted to provide an output voltage when in the binary ZERO state sufficient to back bias the node diodes, said flip flops further being adjusted to provide an output voltage when in the binary ONE state that permits current flow through the node diodes; reset means to switch all of the flip flops to the binary ZERO state; means for sequentially switching the various flip flops to the binary ONE state so that the back bias is removed from the node diodes associated with successively higher valued binary weighted resistors; and means responsive to an error signal to reset a flip flop to the binary ZERO state before the following flip flop is switched by the sequential switching means.

References Cited

UNITED STATES PATENTS

| | | | |
|---|---|---|---|
| 2,940,071 | 6/1960 | Kindred | 340—347 |
| 3,059,223 | 10/1962 | Bell | 340—347 |
| 3,087,150 | 4/1963 | James | 340—347 |
| 3,127,601 | 3/1964 | Kaenel | 340—347 |
| 3,132,338 | 5/1964 | Schmid | 340—347 |

MAYNARD R. WILBUR, *Primary Examiner.*

W. J. KOPACZ, *Assistant Examiner.*

U.S. Cl. X.R.

324—113